(12) United States Patent  
Healey

(10) Patent No.: US 7,961,331 B2  
(45) Date of Patent: Jun. 14, 2011

(54) SENSING A DISTURBANCE ALONG AN OPTICAL PATH

(75) Inventor: Peter Healey, Ipswich (GB)

(73) Assignee: British Telecommunications Public Limited Company, London (GB)

(*) Notice: Subject to any disclaimer, the term of this patent is extended or adjusted under 35 U.S.C. 154(b) by 216 days.

(21) Appl. No.: 12/280,051

(22) PCT Filed: Feb. 1, 2007

(86) PCT No.: PCT/GB2007/000359  
§ 371 (c)(1),  
(2), (4) Date: Aug. 20, 2008

(87) PCT Pub. No.: WO2007/096579  
PCT Pub. Date: Aug. 30, 2007

(65) Prior Publication Data  
US 2009/0135428 A1 May 28, 2009

(30) Foreign Application Priority Data  
Feb. 24, 2006 (EP) ................................. 06251017

(51) Int. Cl.  
*G01B 9/02* (2006.01)  
*G01L 1/24* (2006.01)  
*G01N 21/00* (2006.01)

(52) U.S. Cl. ................. 356/477; 356/35.5; 356/73.1

(58) Field of Classification Search ............. 356/35.5, 356/73.1, 477, 483; 250/227.19, 227.27; 398/17, 20  
See application file for complete search history.

(56) References Cited

U.S. PATENT DOCUMENTS

| 4,297,887 A | 11/1981 | Bucaro et al. |
| 4,370,610 A | 1/1983 | Allen |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A | 2/1986 | Bowers et al. |

(Continued)

FOREIGN PATENT DOCUMENTS

EP 0 251 632 A2 1/1988

(Continued)

OTHER PUBLICATIONS

International Search Report for PCT/GB2007/000359 mailed May 2, 2007.

(Continued)

*Primary Examiner* — Michael A Lyons  
(74) *Attorney, Agent, or Firm* — Patterson Thuente Christensen Pedersen, P.A.

(57) ABSTRACT

The present invention relates to a system for sensing a disturbance in a sensing region along an optical path. The sensing system includes: a source of optical radiation; an upstream junction for channelling light along a first path and along a second path, the first and second paths each extending through the sensing region in an acoustically coupled relationship, such that, in use, a disturbance experienced at one of the first and second paths is experienced at the other of the first and second paths; and, a downstream junction for combining light from the first path with light from the second path so as to provide an interferometric signal from which the presence of a disturbance can be inferred.

12 Claims, 2 Drawing Sheets

U.S. PATENT DOCUMENTS

| | | | |
|---|---|---|---|
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,885,462 A | 12/1989 | Dakin |
| 4,885,915 A | 12/1989 | Jakobsson |
| 4,897,543 A * | 1/1990 | Kersey ............... 250/227.27 |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,025,423 A | 6/1991 | Earp |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher et al. |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,307,410 A | 4/1994 | Bennett |
| 5,311,592 A | 5/1994 | Udd |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,359,412 A * | 10/1994 | Schulz ............... 356/478 |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,384,635 A | 1/1995 | Cohen |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,592,282 A | 1/1997 | Hartog |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,982,791 A | 11/1999 | Sorin |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,148,123 A | 11/2000 | Eslambolchi |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,381,011 B1 | 4/2002 | Nickelsberg |
| 6,459,486 B1 | 10/2002 | Udd et al. |
| 6,487,346 B2 | 11/2002 | Nothofer |
| 6,489,606 B1 | 12/2002 | Kersey et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,704,420 B1 | 3/2004 | Goedgebuer et al. |
| 6,788,417 B1 | 9/2004 | Zumberge et al. |
| 6,813,403 B2 | 11/2004 | Tennyson |
| 6,859,419 B1 | 2/2005 | Blackmon et al. |
| 6,943,872 B2 | 9/2005 | Endo et al. |
| 7,006,230 B2 | 2/2006 | Dorrer et al. |
| 7,110,677 B2 | 9/2006 | Reingand |
| 7,397,568 B2 | 7/2008 | Bryce |
| 7,548,319 B2 | 6/2009 | Hartog |
| 7,667,849 B2 | 2/2010 | Sikora et al. |
| 7,755,971 B2 | 7/2010 | Heatley et al. |
| 7,796,896 B2 | 9/2010 | Sikora et al. |
| 7,817,279 B2 | 10/2010 | Healey |
| 7,848,645 B2 | 12/2010 | Healey et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2004/0227949 A1 | 11/2004 | Dorrer et al. |
| 2006/0163457 A1 * | 7/2006 | Katsifolis et al. ........ 250/227.14 |
| 2006/0256344 A1 | 11/2006 | Sikora et al. |
| 2007/0009600 A1 | 1/2007 | Edgren et al. |
| 2007/0065150 A1 | 3/2007 | Sikora et al. |
| 2007/0127933 A1 | 6/2007 | Hoshida et al. |
| 2007/0264012 A1 | 11/2007 | Healey et al. |
| 2008/0013161 A1 | 1/2008 | Tokura et al. |
| 2008/0018908 A1 * | 1/2008 | Healey et al. ............ 356/483 |
| 2008/0123085 A1 | 5/2008 | Sikora et al. |
| 2008/0166120 A1 | 7/2008 | Heatley et al. |
| 2008/0219093 A1 | 9/2008 | Heatley et al. |
| 2008/0219660 A1 | 9/2008 | Healey et al. |
| 2008/0232242 A1 | 9/2008 | Healey et al. |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0252491 A1 | 10/2009 | Healey |
| 2009/0274456 A1 | 11/2009 | Healey et al. |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |

| | | | |
|---|---|---|---|
| WO | WO 02/065425 A1 | 8/2002 | |
| WO | WO 03/014674 A2 | 2/2003 | |
| WO | WO 2005/008443 A2 | 1/2005 | |

OTHER PUBLICATIONS

Application and File History of U.S. Appl. No. 11/918,434, Inventor: Healey, filed Oct. 12, 2007, as available on PAIR at www.uspto.gov.
Application and File History of U.S. Appl. No. 11/663,954, Inventor: Sikora, filed Mar. 28, 2007, as available on PAIR at www.uspto.gov.
Application and File History of U.S. Appl. No. 12/280,038, Inventor: Healey, filed, Aug. 20, 2008, as available on PAIR at www.uspto.gov.
Application and File History of U.S. Appl. No. 11/791,927, Inventor: Sikora, filed, May 31, 2007, as available on PAIR at www.uspto.gov.
Application and File History of U.S. Appl. No. 12/295,784, Inventor: Healey, filed, Oct. 2, 2008, as available on PAIR at www.uspto.gov.
Application and File History of U.S. Appl. No. 10/594,433, Inventor: Healey, filed, Sep. 26, 2006, as available on PAIR at www.uspto.gov.
Application and File History of U.S. Appl. No. 12/280,047, Inventor: Healey, filed, Aug. 20, 2008, as available on PAIR at www.uspto.gov.
Application and File History of U.S. Appl. No. 11/887,382, Inventor: Healey, filed, Sep. 28, 2007, as available on PAIR at www.uspto.gov.
Application and File History of U.S. Appl. No. 11/663,957, Inventor: Healey, filed, Mar. 28, 2007, as available on PAIR at www.uspto.gov.
Application and File History of U.S. Appl. No. 11/403,200, Inventor: Sikora, filed, Apr. 13, 2006, as available on PAIR at www.uspto.gov.
Application and File History of U.S. Appl. No. 10/573,266, Inventor: Sikora, filed, Mar. 23, 2006, as available on PAIR at www.uspto.gov.
Application and File History of U.S. Appl. No. 11/791,923, Inventor: Healey, filed, May 31, 2007, as available on PAIR at www.uspto.gov.
Application and File History of U.S. Appl. No. 11/885,275, Inventor: Heatley, filed, Aug. 29, 2007, as available on PAIR at www.uspto.gov.
Application and File History of U.S. Appl. No. 11/885,400, Inventor: Heatley, filed, Aug. 30, 2007, as available on PAIR at www.uspto.gov.
Application and File History of U.S. Appl. No. 11/916,054, Inventor: Sikora, filed, Nov. 30, 2007, as available on PAIR at www.uspto.gov.
Japanese Office Action for Japanese Application No. 2007-505635 mailed Aug. 17, 2010.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.
International Search Report dated Nov. 22, 2005.
International Search Report for PCT/GB2005/003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/00750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report dated May 16, 2006 in PCT/GB2005/004850.
International Search Report dated Mar. 15, 2006, mailed Mar. 24, 2006 in PCT/GB2005/004873.
UK Search Report dated May 24, 2005 in GB506591.7.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.

* cited by examiner

SENSING A DISTURBANCE ALONG AN OPTICAL PATH

CROSS-REFERENCE TO RELATED APPLICATIONS

This application is the U.S. national phase of International Application No. PCT/GB2007/000359 filed 1 Feb. 2007 which designated the U.S. and claims priority to European Patent Application No. 06251017.7 filed 24 Feb. 2006, the entire contents of each of which are hereby incorporated by reference.

TECHNICAL FIELD

The present invention relates to the sensing of a disturbance, in particular to the sensing of a disturbance along an optical path.

BACKGROUND

Several techniques are known for sensing a disturbance along an optical link. In one type of interferometric technique, the disturbance is an environmental disturbance, such as an acoustic wave or other time-varying disturbance which causes a phase change to light signals propagating along the link. However, many of these techniques rely on backscattering or reflection along the optical link. The need for backscattering or reflection can make these techniques unsuitable for use with long haul optical links because long haul links normally have one or more repeater amplifiers, each with an optical isolator which acts as a barrier to backscattered or reflected light.

SUMMARY OF THE INVENTION

According to the present invention, there is provided a sensing system for sensing a disturbance in a sensing region, the sensing system including: a source of optical radiation; an upstream junction for channelling light along a first path and along a second path, the first and second paths each extending through the sensing region in an acoustically coupled relationship, such that, in use, a disturbance experienced at one of the first and second paths is experienced at the other of the first and second paths; and, a downstream junction for combining light from the first path with light from the second path so as to provide an interferometric signal from which the presence of a disturbance can be inferred.

The term reference to acoustic coupling will be understood to encompass the coupling of audible as well as inaudible disturbances, either cyclic or transient in nature, which disturbances include for example ultrasound waves, pressure fronts, and other time varying disturbances.

The first and second paths will preferably each be formed, at least in part, by a respective first and second waveguide, the waveguides being retained in a side-to-side arrangement (such as in a substantially in parallel or in a twisted or repeated self-crossing arrangement) by retaining means. The waveguides may be acoustically coupled directly through a contact area between the waveguides, or indirectly through a coupling medium or through the retaining means. Thus, if a disturbance is applied to one of the waveguides, the disturbance will be coupled to the other waveguide. Preferably, the first and second waveguides will be arranged to carry the first and second paths in a spaced apart fashion, so as to provide optical isolation between the paths.

In a preferred embodiment, the first and second waveguides will be formed by respective first and second optical fiber portions. The first and second optical fibers will preferably be retained within a common jacket, sheath or other sleeve, so as to form a cable. However, the optical fibers may be located within separate cables, the cables being held together with spaced apart clips for example or within a common duct or conduit.

Preferably, there is provided a first delay stage and a second delay stage along the first and second optical paths respectively for imposing a temporal delay to signals travelling along each path, the first delay stage being situated at an upstream location relative to the sensing region, and the second delay stage being located at a downstream location relative to the sensing region (here, the terms "upstream" and "downstream" relate to the direction of light propagation along the paths).

The optical source will preferably be of the type that has a coherence time associated therewith, the source producing a waveform with irregular phase variations that occur on a time-scale given by the coherence time of the source. The coherence time of the source may be 10 nano seconds or less (but not so short at to make the matching of the delay stages excessively difficult, so preferably longer than about 100 pico seconds). The upstream junction will preferably serve to create pairs of signal copies with common phase variations, in which case the delay stage upstream of the sensing portion will serve to impose a temporal offset between signal copies of a given pair. The downstream delay stage will then serve to realign the signal copies of each pair.

Because of the configuration of the sensing system, the temporal offset between signal copies of a pair imposed by the upstream delay stage may but need not be greater than the coherence time of the source. To realign effectively the signal copies of a given pair after the signals have traversed the sensing region, the respective delay provided by the first and second delay stages is equal to within the coherence time of the source. However, the delay imposed by the first and second delay stages may differ by a time that is greater than the coherence time, although this will result in a reduced system sensitivity.

The optical source will preferably be operated in a continuous mode fashion, optical signals from the source being joined seamlessly as a continuous waveform (in such a situation, the distinction between consecutive signals will be notional). However, a pulsed source may be used if a lower sensitivity can be tolerated.

According to a further aspect of the invention, there is provided a method of sensing system for sensing a disturbance in a sensing region, including the steps of: at an upstream junction, channelling optical radiation along a first path and along a second path, the first and second paths each extending through the sensing region in an acoustically coupled relationship, such that, in use, a disturbance experienced at one of the first and second paths is experienced at the other of the first and second paths; and, at a downstream junction, interferometrically combining light from the first path with light from the second path so as to provide an interferometric signal from which the presence of a disturbance can be inferred.

To reduce the amount of dispersion experienced by the light as it travels along each path, the light travelling along each path will be carried in single mode fashion,

BRIEF DESCRIPTION OF THE DRAWINGS

The present invention will now be described in further details below, by way of example, with reference to the following drawing in which.

DETAILED DESCRIPTION OF THE DRAWINGS

Figure 1:
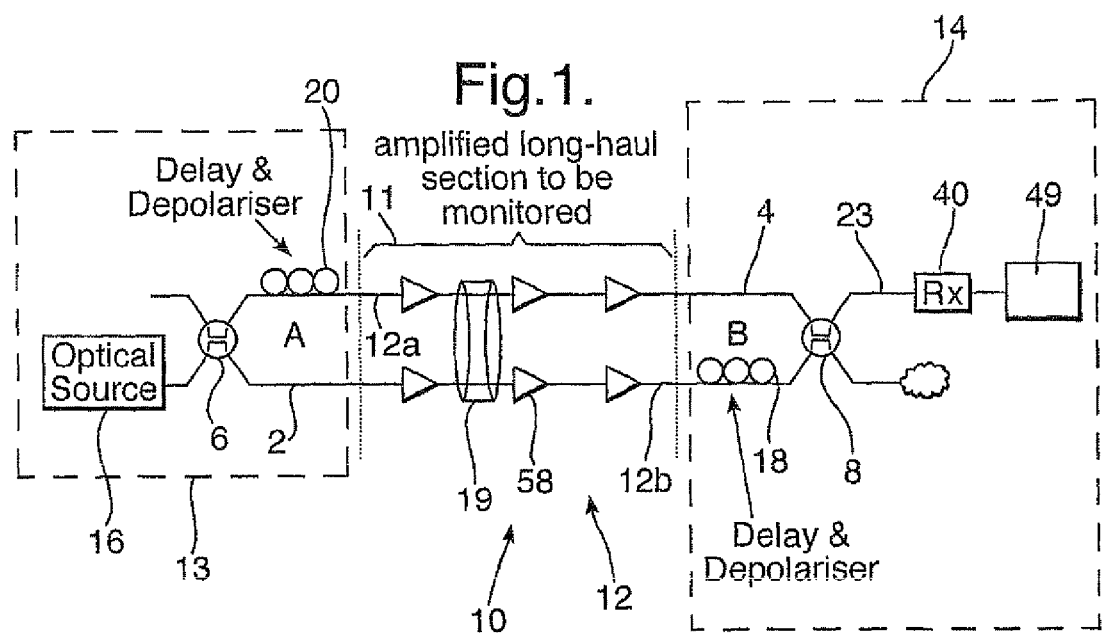
FIG. 1 shows a sensing system according to the present invention.

FIG. 1 shows a sensing system for sensing a disturbance or other environmental effect. The system includes a first optical path 2 and a second optical path 4, each of which extend between an upstream coupler 6 and a downstream coupler B. An optical source 16 is coupled to the upstream coupler for providing optical signals onto the first and second paths. The upstream coupler 6 acts as a intensity splitter, here a 50:50 splitter, sharing between the first and second paths the radiation intensity from the source. The downstream coupler 8 acts as a combiner, combining the radiation from the first and second paths, and providing an output optical signal that is the interferometric combination of the light from the first and second paths. A receiver such as a photodiode 40 is coupled to the downstream coupler, so as to convert optical signals from the downstream coupler into electrical signals. The electrical signals from the receiver 40 are passed to a signal processing stage 49 for processing.

In a sensing region 11 where sensing is to be carried out, the first and second paths are respective optical fiber paths 12a, 12b extending in a side-to-side fashion within a common sheath 19, so as to form a cable 12. The cable 12 is interrupted by optical amplifiers 15 at intervals along each optical path 12a, 12b. The amplifiers allow signals travelling along the paths to be amplified, thereby at least party compensating for losses due for example to Rayleigh backscattering. The amplifiers along each given path are arranged such that signals travelling one path remain optically de-coupled from signals travelling along the other paths. The optical cable 12 may extend over a distance of several hundred or even thousands of kilometers. Such an arrangement is particularly suitable for links extending along the sea bed, for example to sense seismic events. Each of the optical paths 2,4 includes a respective delay stage 18,20 for introducing a time delay D to signals travelling along the respective path, the delay D being substantially the same on both paths. Importantly, the delay stage along one path, here the first path, is provided downstream of the sensing region 11, whereas the delay stage along the other path is provided upstream of the sensing region.

Each delay stage is provided by a coiled portion of optical fiber (single mode at 1550 nm or other infra red wavelength), having a length of between 10 km and 20 km for example The delay stage will preferably be configured to include a depolariser, so as to randomise or scramble the polarisation state of light travelling therethrough. This will be helpful in situation where the paths between the upstream and downstream couplers are birefringerent, that is, have a different refractive index for different polarisation states.

The optical source 16 will preferably have a short coherence time, producing a waveform having phase irregularities which normally occur randomly on a time-scale given by the coherence time of the source (a source which produces non-random variations in phase could be used instead). Typically, the coherence time is inversely related to the spectral width of the source, with the result that the short coherence time of the source will result in a broad spectral width. The optical source will preferably be operated in a continuous mode fashion, optical signals from the source being joined seamlessly as a continuous waveform (in such a situation, the distinction between consecutive signals will be notional). Examples of a suitable optical sources include: a light emitting diode; a Fabry-Perot laser; and, a source of amplified spontaneous emission such as an Erbium-Doped Fiber Amplifier or a Semiconductor Optical Amplifier (although care will have to be taken in choosing a source with a coherence time that is not so short as to make it excessively difficult to math the delay stages to within the coherence time).

Considering the operation of the sensing system, the upstream coupler 6 serves to copy the optical signals from the source 16, such that for each signal produced by the source in a time interval, there is a first signal copy and a second signal copy (the first and second copies of a pair need not be exact duplicates of one another, provided that there are phase irregularities in the waveform from the source that are common to each copy of a given pair). One copy is directed along the first path by the upstream coupler 6, whilst the other copy is directed along the second path. Because of the delay D imposed upstream of the sensing region 11 on the second path but not the first path, the signal copies of a given pair travel with a temporal offset to one another along the cable 12 in the sensing region. This temporal offset is undone by the delay stage 18 on the first path, downstream of the sensing region 11. Thus, in the absence of a disturbance, the interference occurring at the downstream combiner and thus the intensity of the output signal therefrom will be substantially constant with time.

However, a disturbance will alter the phase of signals travelling along each path in a time-varying manner. Even if the disturbance alters the optical path length of both the first and the second paths in the same way, because the signal copies of a given pair are temporally offset from one another, and because the disturbance is time-varying, the two copies of a given pair are likely to be affected by the disturbance differently. Consequently, the output signal from the downstream coupler will change when a disturbance occurs.

The sensing system can be viewed as an interferometer arrangement, in particular a Mach Zehnder interferometer arrangement (preferably one that is substantially balanced to within the coherence time of the source), the first and second paths forming a first and a second arm of the interferometer. However, unlike some other Mach Zehnder interferometer arrangements, the system will be sensitive to a disturbance even if the disturbance is applied to both arms of the interferometer in the same manner. This property is likely to be useful in situations where the arms of the interferometer are formed by fiber paths that are in a mechanically or accoustically coupled arrangement, as will normally be the case where the arms are held together in a common sleeve, jacket, sheath or other protective or retaining means in the manner of an optical cable for example. In particular, if the arms or paths are held together in the same cable, a disturbance will normally be applied to or through an exterior surface of the cable, with the result that the disturbance felt at each optical path will be very similar.

Clearly, the choice of differential delay D along each of the paths 2,4 is important in order to obtain a good system sensitivity. One consideration when choosing the delay time relates to the frequency components of a disturbance which are to be detected: the sensitivity of the sensing system to frequencies much lower than the inverse of the delay time will be, attenuated. Although this suggests a long delay time, this should be balanced against the attenuation that a long delay line in the interferometers will bring about. Typically, a delay line (formed by glass-based optical fiber) of about 10 kilometers to 20 kilometers is thought to provide a good response at acoustic frequencies.

The respective delay time D along each path should ideally be identical. In practise, however, a match to within the coherence time of the source 15 will be acceptable. That is, if the coherence time of the source is given by C then the differential delay D1, D2 of each interferometer should be such that $D2-C<D1<D2+C$. However, the situation for example where $D2-2C<D1<D2+2C$ is thought to still provide a reasonable response to disturbances.

Figure 2:
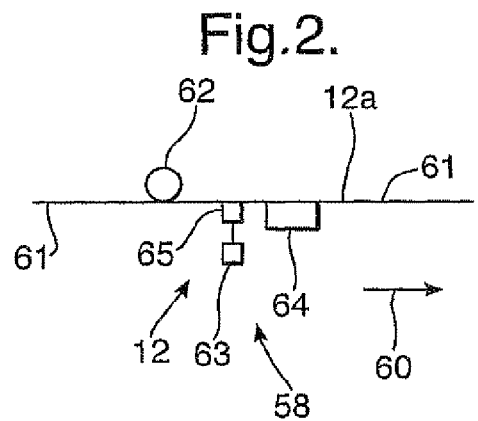
FIG. 2 shows in more detail a portion of an optical link of FIG. 1.

With reference to FIG. 2, which shows one of the optical fiber path (here 12a) in more detail, each of the optical fiber paths 12a, 12b includes at least one optical amplifier 58 and optical fiber portions 61 respectively extending to and from the amplifier (only one amplifier is shown for clarity). In FIG. 2, an arrow 60 indicates the travel direction of the optical signals from the optical source 15 (i.e., the downstream direction). The amplifier includes, an active region, here a portion of Erbium doped fiber 62 for amplifying light travelling therealong; an optical pump 63 for pumping the doped fiber with pumping radiation; a WDM coupler 65 for coupling the pumping radiation into the optical fiber waveguide portion 61 downstream of the portion of Erbium doped fiber 62; and, an optical isolator 64 which allows amplified light (which has passed through the Erbium doped fiber) to progress in the travel (downstream) direction, but which prevents light travelling in the reverse (upstream) direction from passing. Such a directional element is useful in reducing the likelihood that a significant amount of backscattered light will enter the active region of amplifier and be amplified therein, possibly making the amplifier unstable. Each optical fiber path 12a, 12b will preferably be configured to carry light (at least between the amplifiers 58) in a single mode fashion, and preferably in the infra red spectral region, for example at a wavelength of 1.3 or 1.55 microns. Preferably, each optical fiber path 12a, 12b will carry light over an optical fiber having a core diameter of around 9 or 10 microns. In one embodiment, the cable 12 will include a sub-sea cable, preferably disposed on the sea bed. In such an embodiment, the sub sea cable may be useful in detecting seismic events at the sea bed.

Figure 3:
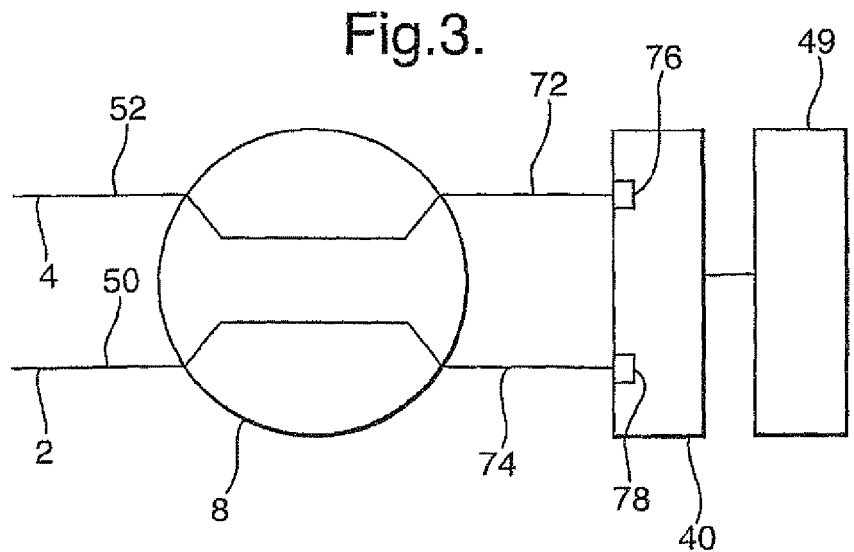
FIG. 3 shows one aspect of a further embodiment of the invention.

In FIG. 1, the receiver 40 receives optical signals from just one of the outputs of the downstream coupler 8. However, as can be seen more clearly in FIG. 3, the downstream coupler 8 is a 2.times.2 coupler having a first and a second input 50,52, as well as a first output 72 and a second output 74. The inputs receive radiation from the first and second paths so as to generate interference signals resulting form the coupling of the radiation from the first and second paths. Each of the outputs will provide an interferometric signal, the interferometric signals from each output 72, 74 being complementary to one another. In the embodiment of FIG. 3, the receiver 40 is a differential detector having a first input 76 and a second input 78, the first and second inputs being arranged to receive the interferometric signal from the first and second outputs respectively of the downstream coupler 8. Because the receiver is a differential receiver, the output from the receiver (which is passed to the signal processing stage 49) will depend on the difference in the interferometric signal from each output of the output coupler. With such an arrangement, the signal sent to the signal processing stage 49 will be less sensitive to fluctuations in the amplitude of the optical signal arriving at the downstream coupler. This arrangement is likely to be particularly beneficial the situation shown in FIG. 1, where amplifiers 58 are provided along the path of the optical cable, since such amplifiers normally require a monitoring signal, which monitoring signal normally takes the form of an amplitude modulation of the light travelling along the paths of the optical cable.

Returning to FIG. 1, the optical source 16 as well as the upstream coupler 8 may be located at a transmitter station 13. Similarly, the downstream combiner 8, the receiver 40 and the signal processing stage 49 may be located at a receiver station 14 as indicated by the dashed lines (each of the stations 13, 14 may be distributed, and need not each be entirely located at respective buildings).

Figure 4:
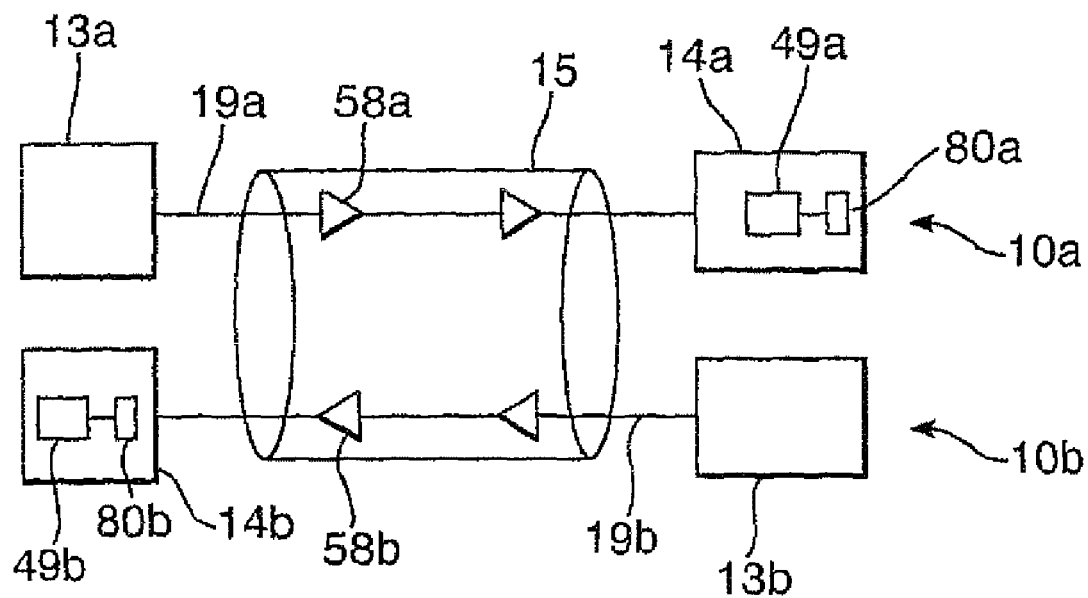
FIG. 4 shows a sensing system suitable for evaluating the position of a disturbance; and, FIG. 5 a schematic illustration of a plurality of paths in the system of FIG. 4.

FIG. 4 shows a location system suitable for sensing the location of a disturbance. The system is formed from a first sensing system 10a and a second sensing system 10b Each sensing system 10a, 10b is configured to detect a disturbance as described above with reference to FIG. 1, each having a respective transmitter station 13a, 13b and a respective receiver station 14a, 14b.

A first link 19a extends between the transmitter and receiver stations 13a, 14a of the first sensing system 10a, whilst a second link 19b extends between the transmitter and receiver stations 13b, 14b of the second sensing system 10b. The first and second links 19a, 19b each include a first and a second (preferably amplified) path in a similar fashion to that of FIG. 2. The first and second paths of each of the links 19a, 19b are held in a common sheath as to form a cable 15 (each of the paths may be formed at least in part by a respective optical fiber in a common jacket, although the paths may be held in another manner provided a disturbance to one path is felt by the other paths). The two sensing systems are arranged to carry optical radiation in opposite directions to one another, thereby allowing for bi-directional communication. Thus, towards one end of the cable, there is located the transmitter station 13a of the first sensing system and the receiver station 14b of the second sensing system, whilst towards the other end of the cable there is located the transmitter station 13b of the second sensing system and the receiver station 14a of the first sensing system.

Because the first and second links are secured together (for example as a result of being located in the same cable), a disturbance to the cable 15 is likely to disturb both the paths on both of the links 19a, 19b. Therefore, the disturbance will be detected at the receiving stations 14a, 14b of both the first and second sensing systems 10a, 10b. The times at which the disturbance is detected at the two ends of the cable 15 will depend on the position of the disturbance due to the finite transit time of optical signals along the links 19a, 19b, a disturbance near one end of the cable being detected at that end before it is detected at the other end. Thus, by monitoring the cable at two positions and noting the local time at which a disturbance is detected at each position, it is possible to infer the location of the disturbance occurring between the two monitoring position along the cable path.

Accordingly, a first and second clock 80a, 80b is provided at the respective receiver station 14a, 14b of the first and second sensing system 10a, 10b. The clocks 80a, 80b, each of which is for example a crystal quartz clock, are synchronised to one another in a known fashion, for example using a radio link. Considering the receiver station 14a of the first sensing system 10a, the clock 80a is coupled to the signal processing stage 49a thereof, the signal processing stage being configured to note the clock reading at which at disturbance is detected (other components of the receiver station common to those shown in FIG. 1 have been omitted for clarity). The receiver station of the second sensing station 14b is similarly configured so as to record the time registered at the local clock 80b thereof when a disturbance is detected. Furthermore, the signal processing stage 49b of the second sensing station 14b is configured to transmit the recorded time to the signal processing stage 49a of the first sensing system. From the record of the time of detection of the disturbance at the first and second receiving stages, together with information relating to the transit time for signals travelling along the cable, the signal processing stage 49a of the first sensing system is configured to calculate the position of the disturbance.

In the case where location information is obtained from the sensing system with the use of a first and a second link, each with an associated source, the delays along a given link should be matched to within the source coherence length for that link (which may be different for each link).

If the sensing system is used to monitor seismic events, the paths will preferably be formed by optical fiber laid on the sea bed. In this case, the paths of a given link, that is, the paths in FIG. 1, will experience the same disturbance even if they are not part of the same cable. In this case the acoustic coupling will be provide by the sea bed material, which will form a coupling medium between the origin of the disturbance (that is, deep under the sea bed) and each of the paths, so that both paths experience the disturbance. Since seismic events often extend over a large geographical area, the path may be spaced apart, for example at least 1 km apart. Thus, although in many applications the paths in FIG. 1 will be in the same cable (since this is one way of making it likely that each path will experience the same disturbance), there are situations where the paths may be divergent.

Figure 5:
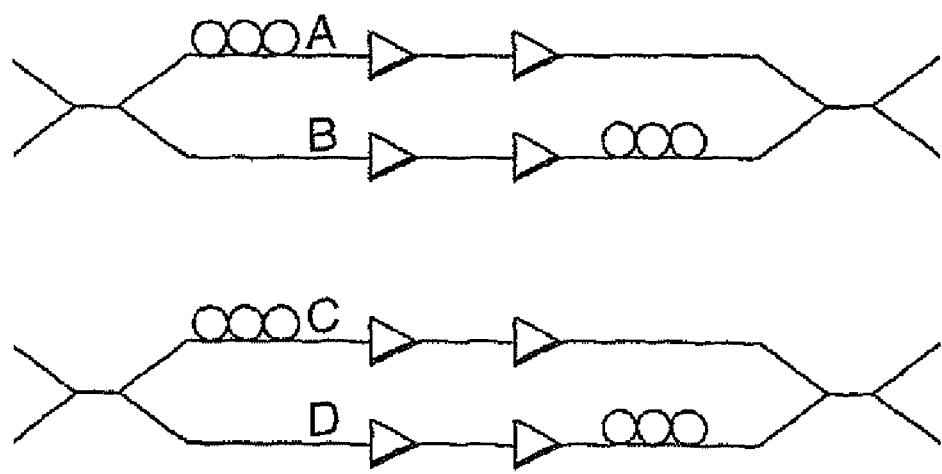

The paths of a given one of the first and second link may be in different cables, and the links do not need be acoustically coupled together for the position of a disturbance to determined, provided that paths in opposite directions to one another (one path from each link) experience the disturbance, for example by being in the same cable. With reference to FIG. 5, where the paths labelled A,B form the first link, and paths C,D form the second link (symbols have the same meaning as in FIG. 1): only paths A and C need be in the same cable for the cable to be sensitive to disturbances, and for the disturbance to be located. Alternatively, the cable may only contain paths A and D. Alternatively the cable may only contain B and C; or, as a further alternative, only paths B and D need be in the same cable in order for a disturbance to that cable to be sensed and its location evaluated. If a cable contains only a single path, a disturbance to that cable will still be sensed, but for a location to be evaluated in the manner explained above, the disturbance should be felt by one of the paths in the opposite direction.

The embodiment(s) above provided a simple way in which existing undersea or other cables can be used to provide a sensor that is distributed, in that the sensor is sensitive in a continuous fashion (at least between amplifiers) over a sensing region, which sensing region can be 1 km or more even several hundred km in extent.

The invention claimed is:

1. A sensing system for sensing a disturbance in a sensing region, the sensing system comprising:
    a source of optical radiation;
    an upstream junction for channeling light along a first path and along a second path, the first and second paths each extending through the sensing region in an acoustically coupled relationship, such that, in use, a disturbance experienced at one of the first and second paths is experienced at the other of the first and second paths; and,
    a downstream junction for combining light from the first path with light from the second path so as to provide an interferometric signal from which the presence of a disturbance can be inferred.

2. A sensing system as claimed in claim 1, wherein the first and second paths are arranged to extend through the sensing region in a side-by-side fashion.

3. A sensing system as claimed in claim 2, wherein the first and second paths extend along a common sleeve.

4. A sensing system as claimed in claim 1, wherein there is provided a first delay stage and a second delay stage along the first and second paths respectively for imposing a temporal delay to signals travelling along each path, the first delay stage being situated at an upstream location relative to the sensing region, and the second delay stage being located at a downstream location relative to the sensing region.

5. A sensing system as claimed in claim 4, wherein each delay stage is provided by a respective coiled portion of optical fiber.

6. A sensing system as claimed in claim 4, wherein the respective delay provided by the first and second delay stages is equal to or within the coherence time of the source.

7. A sensing system as claimed in claim 1, wherein the optical source has a coherence time associated therewith that is less or equal to 10 nano seconds.

8. A sensing system as claimed in claim 1, wherein the source is a continuous wave source.

9. A method of sensing a disturbance in a sensing region, the method comprising:
    at an upstream junction, channeling optical radiation along a first path and along a second path, the first and second paths each extending through the sensing region in an acoustically coupled relationship, such that, in use, a disturbance experienced at one of the first and second paths is experienced at the other of the first and second paths; and,
    at a downstream junction, interferometrically combining light from the first path with light from the second path so as to provide an interferometric signal from which the presence of a disturbance can be inferred.

10. A method as claimed in claim 9, wherein the light travelling along the first and second path is carried in single mode fashion.

11. A sensing system for sensing a disturbance in a sensing region, the sensing system comprising:
    a source of optical radiation;
    an upstream junction for channeling light along a first path and along a second path, the first and second paths each extending through the sensing region in an acoustically coupled relationship, such that, in use, a disturbance experienced at one of the first and second paths is experienced at the other of the first and second paths;
    a downstream junction for combining light from the first path with light from the second path so as to provide an interferometric signal from which the presence of a disturbance can be inferred; and,
    wherein each of the paths includes at least one optical amplifier and optical fiber portions extending to and from the amplifier, each amplifier being arranged to allow amplified light to pass in a travel direction and to prevent light traveling in the reverse direction from passing.

12. A method of sensing a disturbance in a sensing region, the method comprising:
    at an upstream junction, channeling optical radiation along a first path and along a second path, the first and second paths each extending through the sensing region in an acoustically coupled relationship, such that, in use, a disturbance experienced at one of the first and second paths is experienced at the other of the first and second paths;

at a downstream junction, interferometrically combining light from the first path with light from the second path so as to provide an interferometric signal from which the presence of a disturbance can be inferred; and, wherein each of the paths includes at least one optical amplifier and optical fiber portions extending to and from the amplifier, each amplifier being arranged to allow amplified light to pass in a travel direction and to prevent light traveling in the reverse direction from passing.

* * * * *